United States Patent
Wahl et al.

(10) Patent No.: US 7,259,924 B2
(45) Date of Patent: *Aug. 21, 2007

(54) MICROSCOPE OBJECTIVE WITH AXIALLY ADJUSTABLE CORRECTION MOUNTS

(75) Inventors: Hubert Wahl, Stadtroda (DE); Georg Herbst, Goettingen (DE); Ingo Fahlbusch, Goettingen (DE); Renhu Shi, Goettingen (DE); Gerhard Mollenhauer, Landolfshausen (DE); Thomas Guenther, Goettingen (DE); Andreas Busse, Duderstadt (DE); Marion Dambeck, Rosdorf (DE); Adolph Willhelm, Neu-Eichenberg (DE); Wolfgang Hartje, Goettingen (DE); Wolfgang Sebode, Duderstadt (DE); Detmar Nolte, Adelebsen (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/020,710

(22) Filed: Dec. 22, 2004

(65) Prior Publication Data

US 2005/0141109 A1    Jun. 30, 2005

(30) Foreign Application Priority Data

Dec. 24, 2003   (DE) ................. 103 61 911

(51) Int. Cl.
G02B 7/02 (2006.01)
G02B 15/14 (2006.01)
G03B 27/36 (2006.01)

(52) U.S. Cl. ............... 359/823; 359/824; 359/687; 359/694; 355/58

(58) Field of Classification Search ........... 359/823, 359/824, 859, 731, 690, 694, 696, 700, 687, 359/688; 396/50, 81, 84, 142; 355/58, 45, 355/18; 353/100, 101, 37
See application file for complete search history.

(56) References Cited

U.S. PATENT DOCUMENTS

| 2,078,858 | A | * | 4/1937 | Kuhn ..................... 33/298 |
| 2,437,775 | A | * | 3/1948 | Williams ................ 356/632 |
| 2,529,894 | A | * | 11/1950 | Altman et al. .......... 359/704 |
| 2,945,419 | A | * | 7/1960 | Bechtold et al. ........ 359/690 |
| 3,213,539 | A | * | 10/1965 | Burris .................... 42/122 |
| 3,277,783 | A | * | 10/1966 | Eggert .................... 359/702 |
| 4,885,600 | A | * | 12/1989 | Iwasa et al. ............. 396/81 |

(Continued)

FOREIGN PATENT DOCUMENTS

DE       38 12 745       10/1989

(Continued)

Primary Examiner—Loha Ben
(74) Attorney, Agent, or Firm—Reed Smith LLP

(57) ABSTRACT

A microscope objective has axially adjustable correction mounts for adapting to different parameters influencing the imaging quality. The axial adjustment of the correction mounts relative to a stationary barrel is realized by an adjusting ring arranged on the outer side of the barrel by means of a bolt or screw which is arranged in the respective correction mount, is directed radial to the optical axis of the objective and engages in through-openings of threaded rings. The objective has at least three correction mounts which are adjustable in direction of the optical axis of the objective by at least one adjusting ring without additional rotation around the optical axis of the objective.

13 Claims, 9 Drawing Sheets

U.S. PATENT DOCUMENTS 5,337,187 A * 8/1994 Fukino et al. .............. 359/699
2005/0168843 A1 * 8/2005 Herbst et al. ............... 359/813

FOREIGN PATENT DOCUMENTS

| DE | 198 04 470 | 8/1999 |
| DE | 199 47 378 | 4/2000 |
| EP | 0 660 942 | 1/1995 |

* cited by examiner

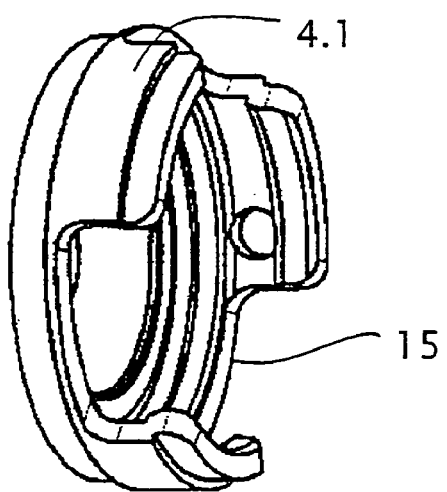
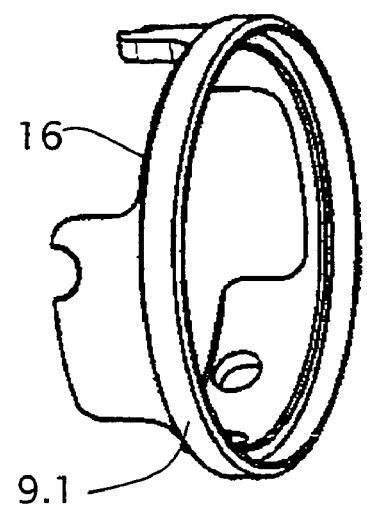
Fig.2                    Fig.3

MICROSCOPE OBJECTIVE WITH AXIALLY ADJUSTABLE CORRECTION MOUNTS

CROSS-REFERENCE TO RELATED APPLICATION

This application claims priority of German Application No. 103 61 911.9, filed Dec. 24, 2003, the complete disclosure of which is hereby incorporated by reference.

BACKGROUND OF THE INVENTION a) Field of the Invention

The invention is directed to a microscope objective with axially adjustable correction mounts in which lenses or lens groups are arranged, particularly for live cell imaging and for cell culture and tissue culture research. The invention is applicable in microscope objectives in connection with different cover slips and/or different immersion liquids and/or at different work temperatures.

b) Description of the Related Art

With these kinds of axial adjustments of optical elements in objectives, different kinds of corrections can be carried out in order to enable microscopic examinations under various conditions with high quality and high lateral magnifications.

In microscope objectives, the axial adjustment of optical elements arranged in correction mounts in relation to stationary optical elements can be realized in different ways.

For example, DE 198 04 470 C1 discloses a microscope objective with a plurality of lens group mounts, one of which is formed as a correction mount for adapting to different cover slip thicknesses and is displaceable axially along the optical axis of the objective for changing position relative to stationary lens mounts. The axial displacement of the correction mount is carried out by means of a guide pin running on cam rings by actuating a knurled ring that is rotatable around the optical axis.

DE 38 12 745 C2 describes a microscope objective with an aperture of at least 0.5 and a device for adjusting to different cover slip thicknesses in which a second lens group is arranged so as to be linearly displaceable between a stationary first lens group and a stationary third lens group, an additional lens group being axially displaceable in the opposite direction relative to this second lens group. The movement strokes of these displaceable lens groups can differ. An individual actuating ring is provided for realizing the displacements of the corresponding lens groups. In this objective, the device for adjusting to different cover slip thicknesses is coupled with a device for refocusing the entire objective. The lens groups are displaced linearly in the course of the adjusting movement. This can be achieved, for example, by means of threads of different pitches or by means of cams which engage in corresponding grooves with a constant but different pitch in a rotatable intermediate ring of the lens mount.

Further, EP 0 660 942 B1 discloses a microscope objective with at least one correction mount in which the correction mount is axially displaceable and is rotatable around the optical axis of the objective. A pin which is movable on a cam groove of a mount support and which is fixedly connected at one end to the correction mount and engages at the other end in a rotatable ring is provided for axial displacement and simultaneous radial rotation of the mount. Two axially displaceable and simultaneously rotatable correction mounts are provided in an objective disclosed in this reference.

DE 199 47 378 A1 describes an adjusting mechanism for an objective which is provided with an axially movable optical element that is connected to the main mount, or barrel, by a sliding mount. A first linear drive is connected by actuating members to a second linear drive which generates the linear movement along the optical axis. The second linear drive is connected to the sliding mount.

With these known microscope objectives, however, at most two parameters influencing the imaging or parameters caused by the environment and image errors can be corrected or compensated by adjusting two optical elements of the microscope objective. But in practice it is often indispensable to take into account the influence of different cover slip thicknesses and different immersion media upon the imaging quality and also environmental influences such as temperature and to compensate for these influences as far as possible by appropriate corrections.

OBJECT AND SUMMARY OF THE INVENTION

Accordingly, it is the primary object of the invention to provide a microscope objective with correction mounts which makes possible an adjustment for purposes of compensating at least three parameters influencing the imaging quality with a good correction of image errors and while retaining a small structural length of the objective.

In accordance with the invention, a microscope objective comprises axially adjustable correction mounts for adapting to different parameters influencing the imaging quality. The axial adjustment of the correction mounts relative to a stationary barrel is realized by an adjusting ring. The adjusting ring is arranged on the outer side of the barrel by a pin which is arranged in the respective correction mount, is directed radial to the optical axis of the objective and engages in through-openings of threaded rings. The objective particularly comprises at least three correction mounts which are adjustable in direction of the optical axes of the objective by at least one adjusting ring without additional rotation around the optical axis of the objective.

According to the invention, this object is met in a microscope objective constructed according to the preamble by the characterizing features of the first claim.

Further embodiments and details of the microscope objective are disclosed in the subclaims.

An advantageous embodiment with a small structural length of the entire objective results when a barrel is fixedly connected to an inner cylindrical sleeve with axially oriented through-openings; axially adjustable correction mounts for receiving optical elements in the form of lenses and/or lens groups are mounted in the cylindrical sleeve and a radially directed bolt or screw projecting through an associated through-opening in the cylindrical sleeve is arranged at the outer side of the correction mounts, respectively; threaded rings are in an operative connection with a respective bolt, are provided with an external thread of the same or different pitch, are mounted on the cylindrical sleeve so as to be axially displaceable only, and engage in an internal thread of corresponding pitch of respective driver rings which are associated with the threaded rings and which are arranged in the barrel so as to be rotatable around the optical axis and are in an operative connection with at least one adjusting ring arranged on the outer side of the barrel and can be rotated with this at least one adjusting ring.

It is advantageous when the driver rings which are in an operative connection with an adjusting ring are fixedly connected to one another and are rotatable jointly by the adjusting ring around the optical axis.

An advantageous arrangement with many possibilities for adjusting the optical elements results when a plurality of adjusting rings are provided, each of which is in an operative connection with at least one driver ring, wherein the individual adjusting rings can advantageously be rotated around the optical axis of the objective independent from one another.

In order to realize different axial adjustment paths of the individual correction mounts, it is advantageous when the driver rings associated with an adjusting ring have threads of identical or different pitch. Different correction conditions in the objective can be taken into account in this way.

Further, it is advantageous when spring elements are arranged between the driver rings and the associated threaded rings to eliminate play or lost motion in the thread.

Pressure springs or elements that can perform the function of a pressure spring can advantageously be used for this purpose.

It is further advantageous when a securing element serving to protect the object is connected to the front correction mount and is movable axially together with the latter.

In order to achieve a connection between a bolt and the associated threaded ring that is without play at all times, it is advantageous when the bolts engage without play in a bore hole which is formed by at least one springing web and which is open toward the edge of the respective associated threaded ring. The diameter of the bore hole is advantageously less than or equal to the diameter of the part of the respective bolt, engaging in the bore hole of the threaded ring so that the bolt is always clamped in the bore hole.

A connection between the bolt and the associated threaded ring without play advantageously results when a flexible intermediate member is provided between the bolt and the wall of the bore hole of the threaded ring.

Primarily in order to limit the rotational area of the adjusting ring by means of fixed stops, it is advantageous that an axially directed pin is provided at an end face situated in the interior of the adjusting ring, that an opening which extends over a circumferential area and whose boundary surfaces form stops for the pin is provided in an end face of the barrel situated farther in the interior of the objective, and that the adjusting ring has a mark on its outer surface and the barrel has a scale with adjustment marks.

It is advantageous when the positions of the axially directed pin and the positions of the stops are oriented toward the mark on the adjusting ring.

The invention serves to realize an optical correction in a microscope objective by axial displacement of three or more optical elements by means of radially moving threaded rings with threads having the same or different pitch, that is, without using the usual cam rings and spiral grooves in individual rings.

Further, in addition to the optical correction, different observation conditions can also be adapted to. This substantially facilitates work with different immersion media, e.g., glycerin or water, and also in different temperature ranges, e.g., at 23° C. or 37° C., as well as use of the microscope with different cover slips of various thickness and tolerance. Further, a small structural length on the order of 50 mm can be achieved with this objective. At a short working distance of about 0.18 mm, it is also possible to realize a reliable protection of the preparation or object in a simple manner.

In the following, the invention will be described more fully in an embodiment example.

BRIEF DESCRIPTION OF THE DRAWINGS

In the drawings:

FIG. 2 shows another mount part of the front optical element;

FIG. 3 shows a mount part of the front optical element;

DESCRIPTION OF THE PREFERRED EMBODIMENTS

Figure 1:
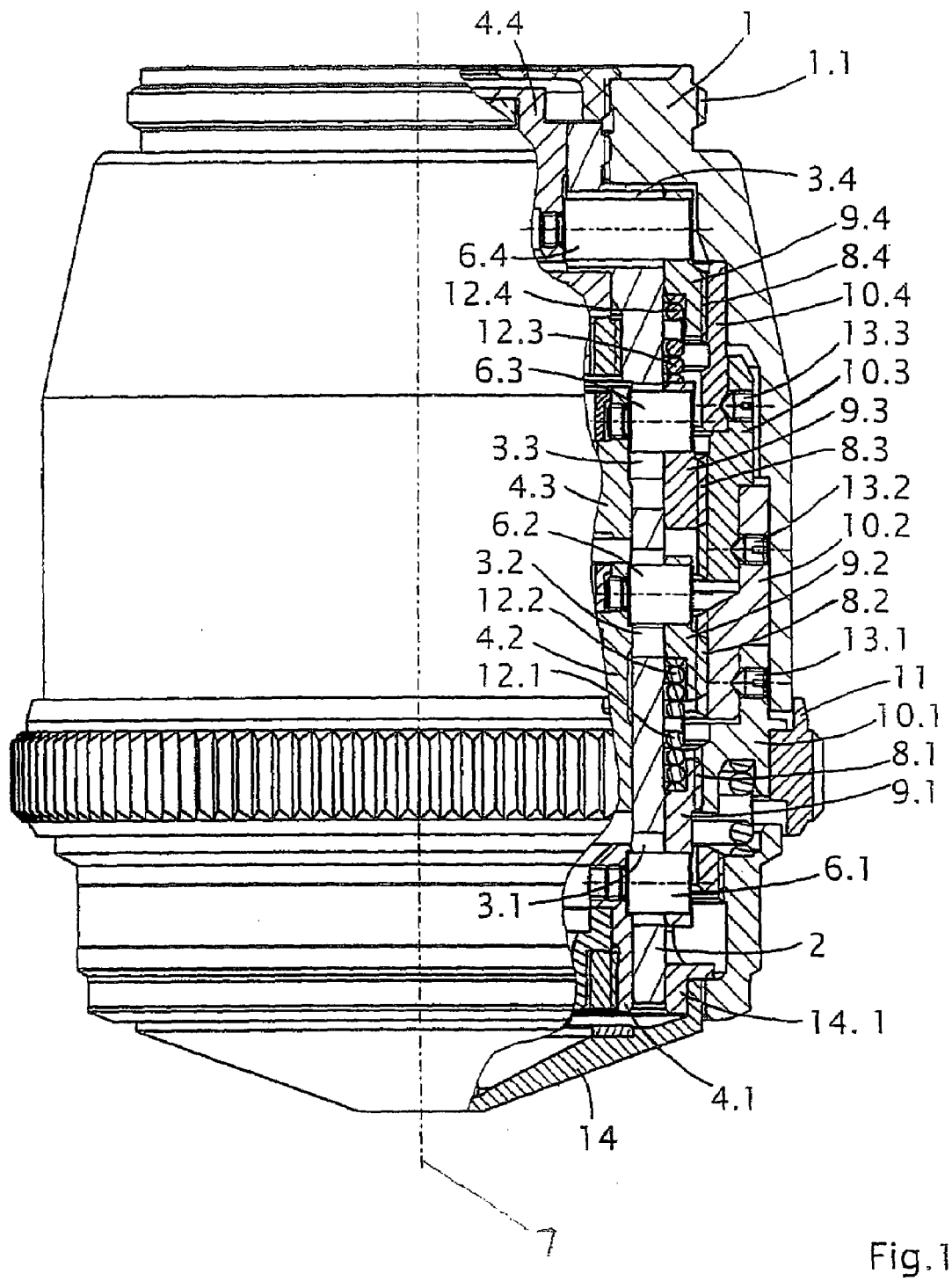
FIG. 1 shows a partial longitudinal section through a microscope objective according to the invention.

The microscope objective shown in partial section in FIG. 1 comprises a barrel 1 provided with an adjusting thread 1.1 and with an inner cylindrical sleeve 2 which is fixedly connected to the latter and which has axially directed through-openings 3.1 to 3.4 and in which precision, axially adjustable correction mounts 4.1 to 4.4 are arranged. In this embodiment example, four correction mounts 4.1 to 4.4 are provided. In principle, it is also conceivable to provide more than four, but at least three, correction mounts. Depending on the quantity of correction mounts provided in the objective, the cylindrical sleeve 2 also has a corresponding quantity of through-openings. The quantity of structural component parts cooperating with the correction mounts depends on the quantity of correction mounts. The individual optical elements (not shown) comprising individual lenses and/or lens groups are fixedly held in these correction mounts 4.1 to 4.4. A radially directed bolt 6.1 to 6.4 which projects (engages) through an associated through-opening 3.1 to 3.4 of the cylindrical sleeve 2 or a screw is arranged at the outer side of the individual correction mounts 4.1 to 4.4 in each instance. One of these bolts 6.1 to 6.4 is in an operative connection with a threaded ring 9.1 to 9.4 associated with it. These threaded rings 9.1 to 9.4 each have an external thread 8.1 to 8.4 and are supported on the cylindrical sleeve 2 so as to be displaceable axially only. On the outer side, the threaded rings 9.1 to 9.4 are enclosed by driver rings 10.1 to 10.4 which are arranged in the barrel 1 and are provided in each instance with an internal thread of corresponding pitch. This internal thread is in an operative connection with the associated external threads 8.1 to 8.4 of the threaded rings 9.1 to 9.4.

The threaded rings 9.1 to 9.4 and the driver rings 10.1 to 10.4 can have threads of the same or different pitch, so that when the driver rings 10.1 to 10.4 mm rotate simultaneously around the optical axis 7 of the objective the threaded rings 9.1 to 9.4 which are fixed with respect to rotation relative to them carry out different displacements in direction of the optical axis 7.

The individual driver rings 10.1 to 10.4 are advantageously connected to one another by screws 13.1 to 13.3 or pins and are in an operative connection with at least one adjusting ring 11 which is actuated externally and is rotatable around the optical axis 7.

The microscope objective according to FIG. 1 is provided with an adjusting ring 11 by which the driver rings 10.1 to 10.4 can be displaced simultaneously and jointly by identical rotations. However, an objective (not shown) having a plurality of adjusting rings is also conceivable. In this case, one or more driving rings are associated with an adjusting ring and different axial displacements of the correction mounts with the optical elements mounted therein can be carried out with these driving rings.

On the object side, the objective has a securing element 14 which serves to protect the object or preparation and which is connected by an intermediate part 14.1 to the front correction mount 4.1 and is moved axially together with the latter.

In order to eliminate the play or lost motion between the mutually engaging threads of the driver rings 10.1 to 10.4 and the associated threaded rings 9.1 to 9.4, spring elements 12.1 to 12.4 are provided. The threaded flanks of the threads of the respective threaded rings and driver rings which are in operative connection with one another are pressed against one another continuously by these spring elements 12.1 to 12.4.

Particularly when a short objective length on the order of 50 mm or less is realized, special measures are required for protecting the object and the preparation and for the axially movable correction mounts 4.1 to 4.4. For this purpose, the correction mount 4.1 of the front optical element (FIG. 2) and the associated first threaded ring 9.1 (FIG. 3) are provided with cutouts 15 and 16. This makes it possible for the threaded ring 9.1 and the correction mount 4.1 to slide one inside the other without obstruction while the correction mount 4.1 and the threaded ring 9.1 are guided precisely at the same time. In objectives with a larger structural length, structural component parts of this kind which engage one inside the other and economize on space can be omitted.

An adjustment of the correction mounts 4.1 to 4.4 is realized in the following manner:

The correction mounts 4.1 to 4.4 in which the optical elements (not shown) are mounted and the threaded rings 9.1 to 9.4 having the external threads 8.1 to 8.4 are connected by bolts 6.1 to 6.4. These bolts 6.1 to 6.4 are guided through the axial through-openings 3.1 to 3.4 of the cylindrical sleeve 2 that is fixedly arranged in the barrel 1 and accordingly, together with the threaded rings 5.1 to 5.4 and the correction mounts 4.1 to 4.4, have only one possible adjustment or displacement in direction of the optical axis 7. A rotation around the axis 7 is not possible. The rotation of the adjusting ring 11 around optical axis 7 causes the driver rings 10.1 to 10.4 which are connected to one another to be rotated around the axis 7 along with it. An axial adjustment of the correction mounts 4.1 to 4.4 and of the optical elements mounted therein is realized through the rotation of the driver rings 10.1 to 10.4 by means of the adjusting ring 11 due to the cooperation of the internal thread of these driver rings with the corresponding external threads 8.1 to 8.4 of the threaded rings 9.1 to 9.4 which are arranged so as to be fixed with respect to rotation.

Figure 4:
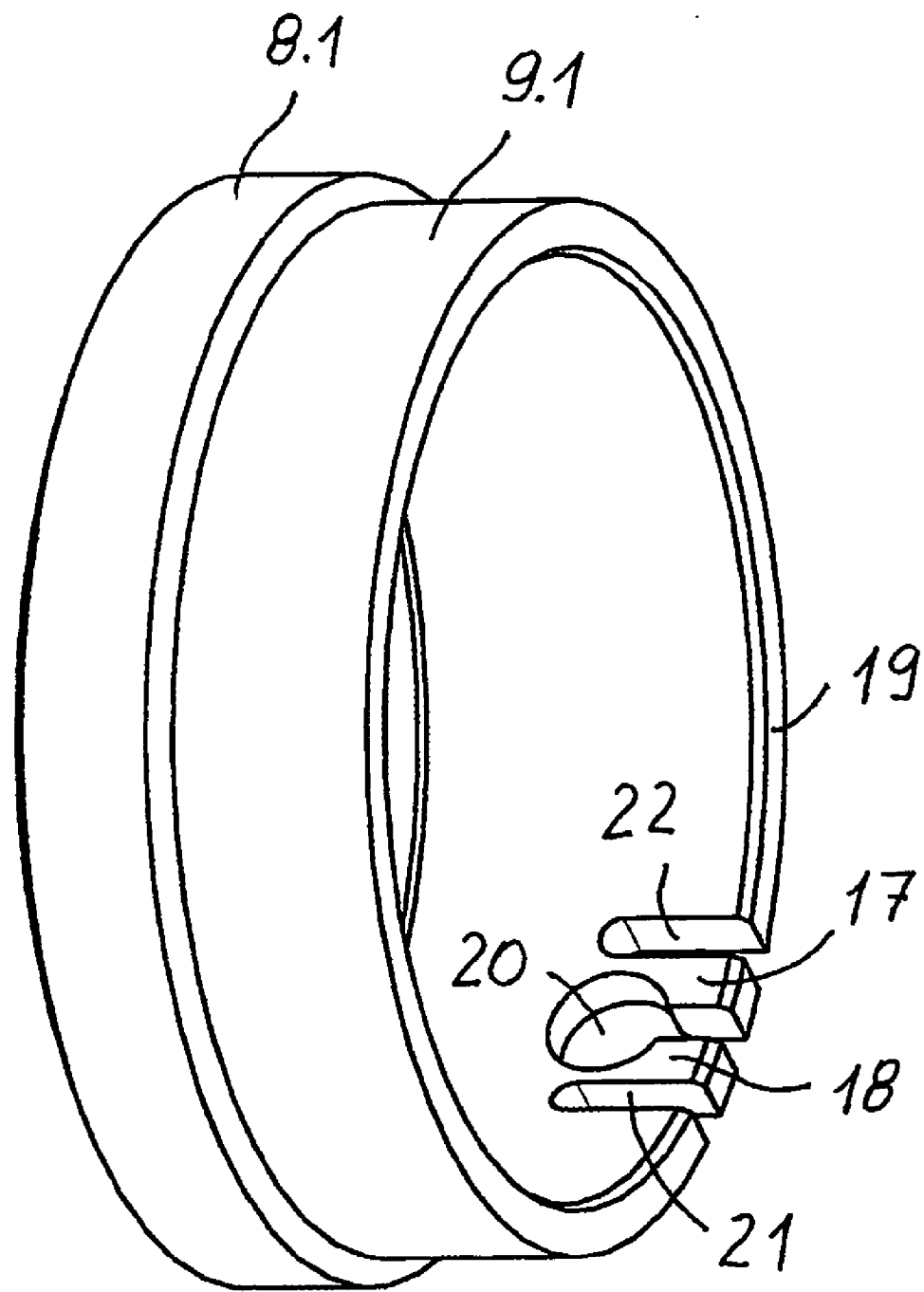
FIG. 4 shows a threaded ring with open bore hole and springing webs.
Figure 5:
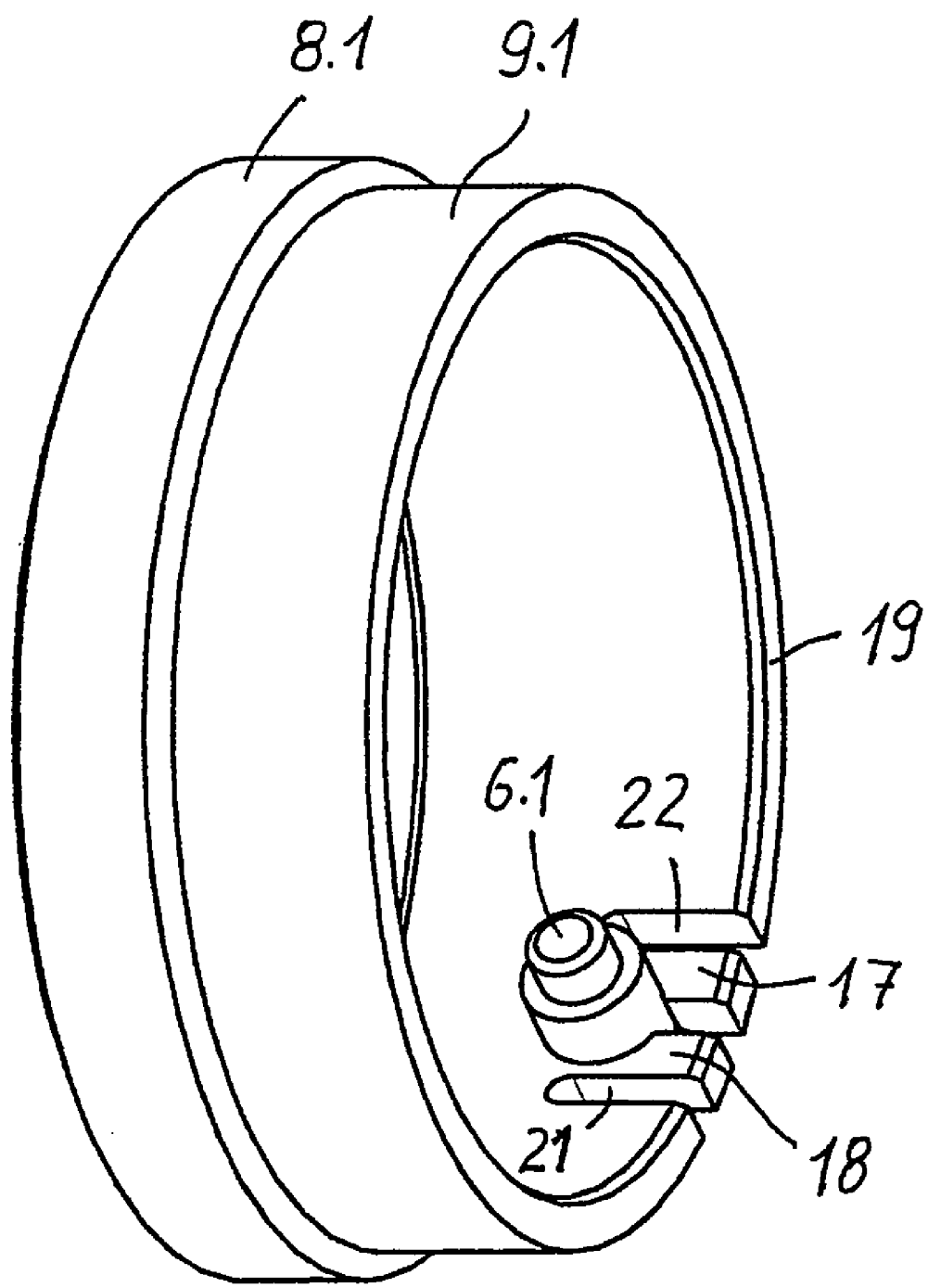
FIG. 5 shows a threaded ring with engaging bolt.

Referring to the example of the threaded ring 9.1 and the bolt 6.1, FIG. 4 and FIG. 5 show how these two structural component parts are connected without play according to the invention. With high-quality microscope objectives in particular, a connection of this kind is absolutely necessary in order to achieve imaging that is virtually free of errors. In a connection of this kind, the radially directed bolts which are screwed into the correction mount 4.1 engage in a bore hole 20 which is free-milled in axial direction of the edge 19 of the threaded ring 9.1. This bore hole 20 is formed by two springing webs 17; 18 which are produced by milled slots 21 and 22 of the threaded ring 9.1. The springing webs 17 and 18 cause a clamping of the bolt 6.1 in the threaded ring 9.1. The shaft of these webs 17; 18 is advantageously dimensioned with respect to its thickness in such a way that they cannot spread farther apart by the movement of the bolt 6.1 and other parts of the objective. The respective bolt 6.1 to 6.4 is arranged without play in the respective bore hole associated with it. Another positive effect occurring in the bore hole 20 is a three-point contact of the bolt 20 so that the respective threaded ring is guided precisely.

It is also possible to provide only one springing web. This facilitates production. However, the three-point contact would be forfeited in this way.

Figure 6:
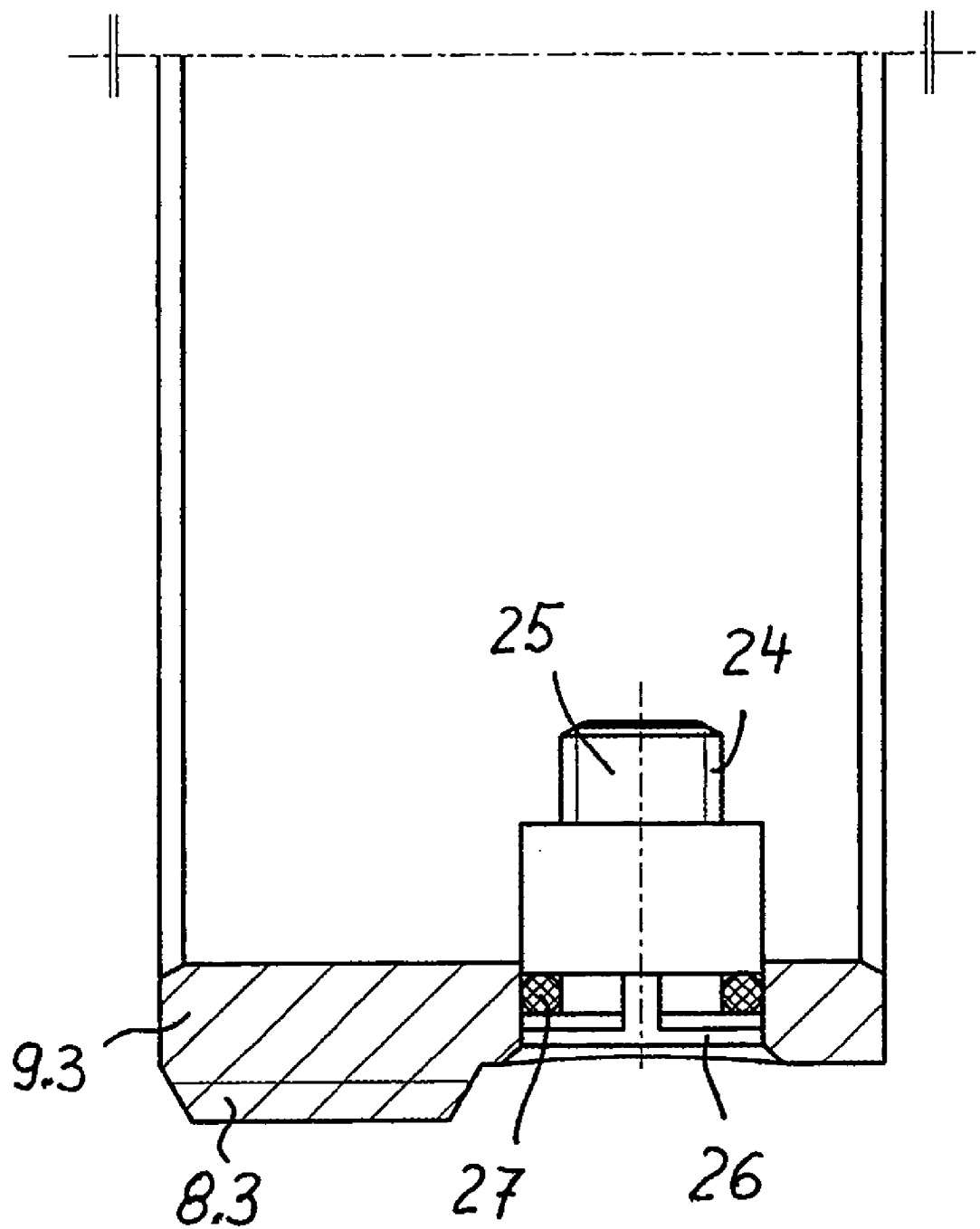
FIG. 6 shows a threaded ring with bolt and flexible element.

FIG. 6 will be described more fully with reference to the threaded ring 9.3 and the bolt 6.3. The bolt 6.3 which is screwed into the correction mount 4.3 (not shown in FIG. 6) by its end 25 provided with thread 24 engages in a bore hole 26 of the associated threaded ring 9.3 provided with the thread 8.3. A flexible intermediate member 27 ensuring the absence of play is arranged between the bolt 6.3 and the wall of the bore hole 26. In the embodiment example, this intermediate member 27 is shaped as a round ring. Other suitable designs of the intermediate member 27 are also possible.

Figure 7:
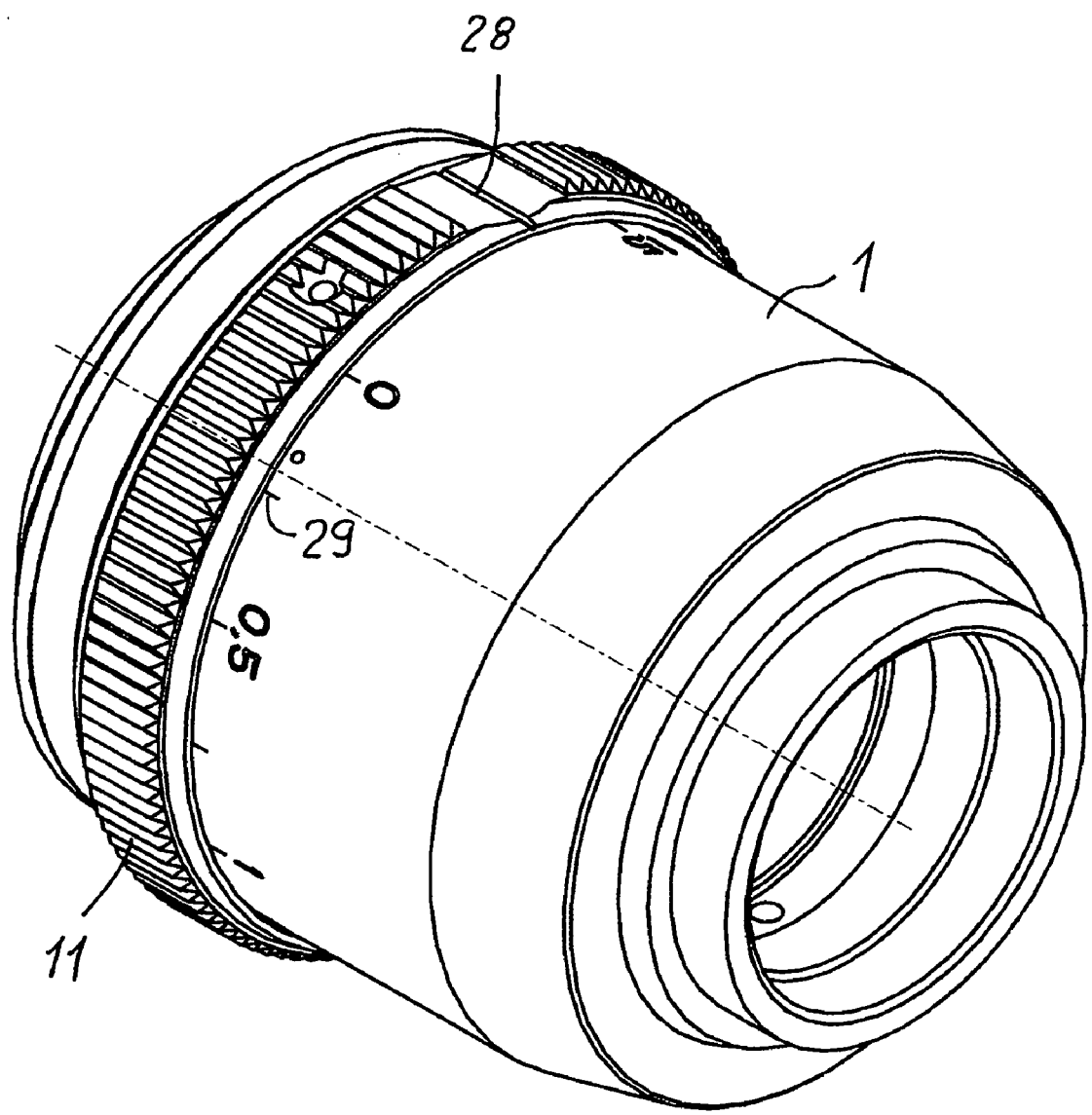
FIG. 7 is a view of an objective with barrel and adjusting ring.

The microscope objective which is shown three-dimensionally in FIG. 7 includes the barrel 1 and the adjusting ring 11 which is mounted therein so as to be rotatable and which has a mark 28. Adjusting marks 29 which can be used, for example, to adapt the objective to different cover slips or also to different environmental conditions are arranged at the barrel 1.

Figure 8:
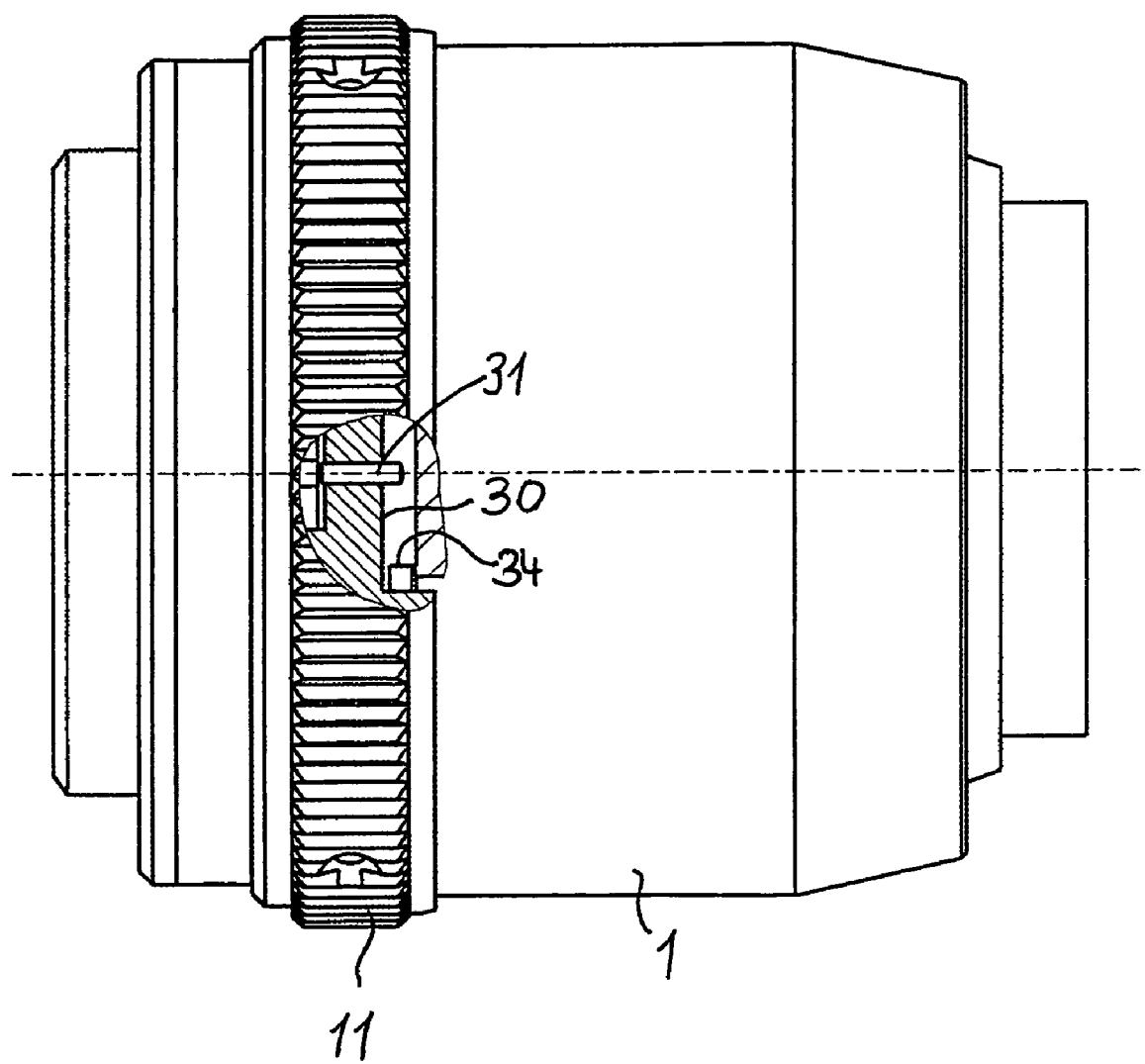
FIG. 8 shows an objective with open adjusting ring.
Figure 9:
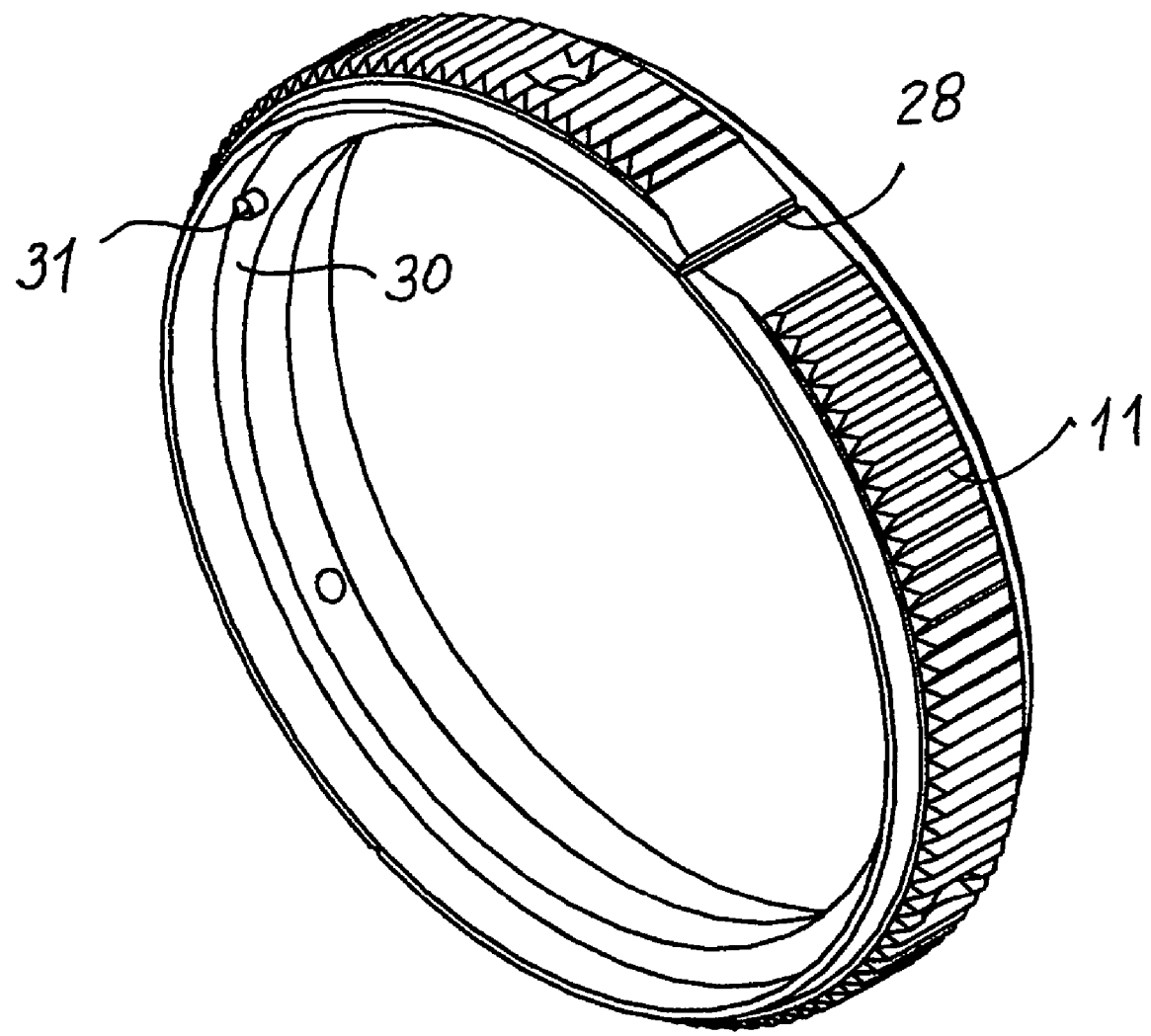
FIG. 9 shows an adjusting ring.
Figure 10:
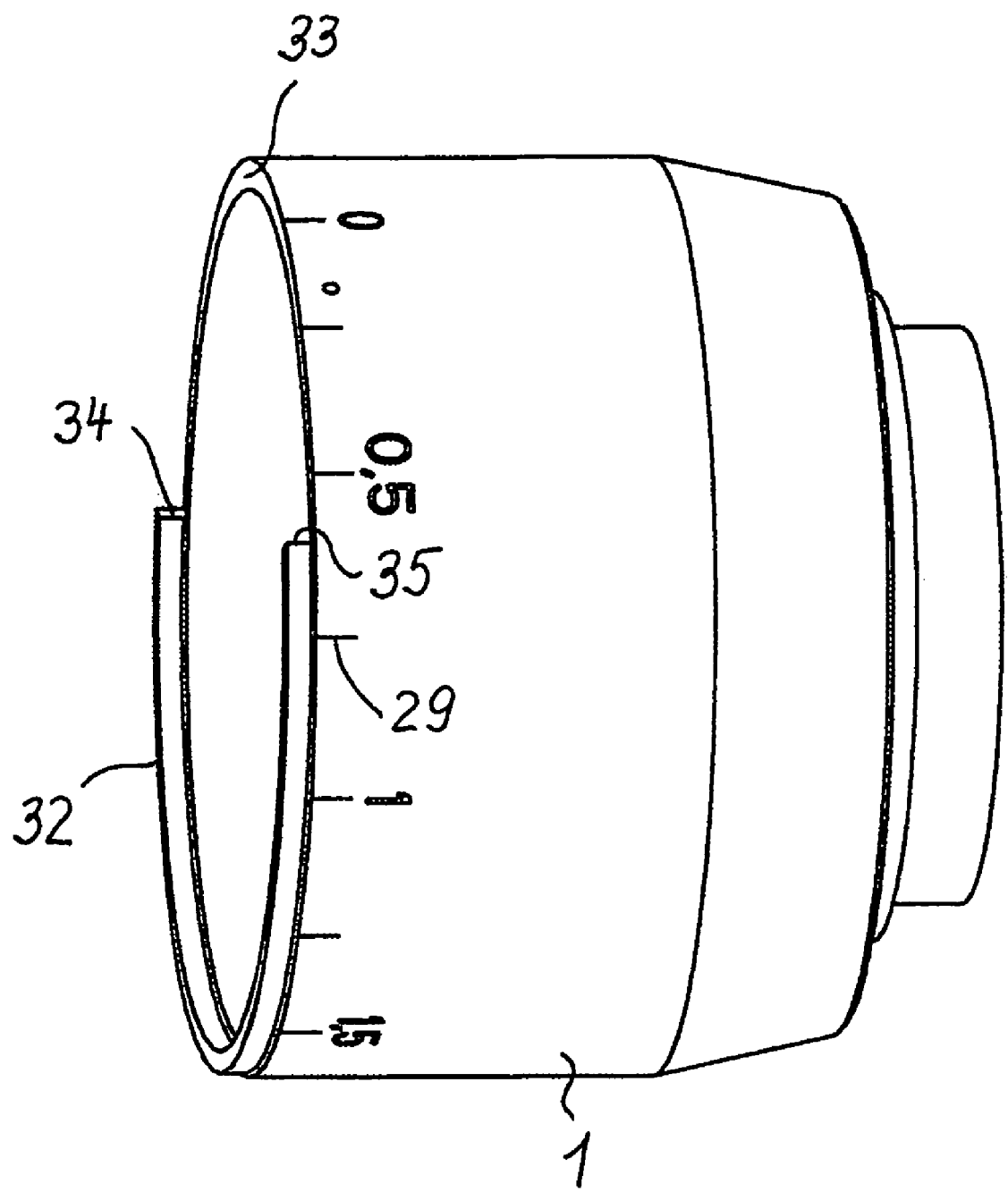
FIG. 10 shows the barrel with opening and scale.

FIGS. 7 and 8 show that an axially directed pin 31 is arranged at an end face 30 situated in the interior of the adjusting ring 11, preferably in a bore hole. This pin 31 is arranged in a defined position with respect to the mark of the adjusting ring 11. The barrel 1 has, in its interior at an end face 32 (FIG. 10), an opening 33 which extends along a circumferential area and whose boundary surfaces serve as stops 34; 35 for the pin 31 when the adjusting ring 11 rotates relative to the barrel 1. The boundary of the opening 33, that is, the stops 34; 35, are likewise oriented to the mark 28 of the adjusting ring 11. The angle of the opening 33 of the barrel 1 determines the extent of overrun which advantageously allows overshooting of the zero adjustment mark in both directions within limits. The uniformity of the overrun is given automatically by the respective orientation of the opening 33 relative to the respective adjustment mark 29 of the barrel 1. By means of this step, a uniform overrun and fixed stops 34; 35 for limiting the rotation of the adjusting ring 11 are achieved without additional parts. This arrangement is applicable in all microscope objectives with one or more adjusting rings, e.g., also in microscope objectives with an iris diaphragm.

While the foregoing description and drawings represent the present invention, it will be obvious to those skilled in the art that various changes may be made therein without departing from the true spirit and scope of the present invention.

REFERENCE NUMBERS 1 barrel
2 cylindrical sleeve
3.1 to 3.4 through-openings
4.1 to 4.4 correction mounts
6.1 to 6.4 bolts
7 optical axis
8.1 to 8.4 external threads 9.1 to 9.4 threaded rings
10.1 to 10.4 driver rings
11 adjusting ring
12.1 to 12.4 spring elements
13.1 to 13.4 screws
14 securing element
14.1 intermediate part
15, 16 cutouts
17, 18 webs
19 edge
20 bore hole
21; 22 milled slots
23 intermediate member
24 thread
25 end
26 bore hole
27 intermediate member
28 mark
29 adjustment mark
30 end face
31 pin
32 end face
33 opening
34; 35 stops

What is claimed is:

1. A microscope objective comprising:
axially adjustable correction mounts for adapting to different parameters influencing the imaging quality, wherein the axial adjustment of the correction mounts relative to a stationary barrel is realized by an adjusting ring;
said adjusting ring being arranged on the outer side of the barrel by a bolt which is arranged in the respective correction mount, is directed radial to the optical axis of the objective; and
said objective particularly comprising at least three correction mounts which are adjustable in direction of the optical axis of the objective by means of the adjusting ring without additional rotation around the optical axis of the objective.

2. The microscope objective according to claim 1, wherein the barrel is fixedly connected to an inner cylindrical sleeve with axially oriented through-openings, said axially adjustable correction mounts for receiving optical elements are mounted in the cylindrical sleeve and the bolt projecting through an associated through-opening in the cylindrical sleeve is arranged at the outer side of the correction mounts, respectively, wherein threaded rings are in an operative connection with the respective bolt, are provided with an external thread having the same or different pitch, are mounted on the cylindrical sleeve so as to be axially displaceable only, and engage in an internal thread of corresponding pitch of respective driver rings which are associated with the threaded rings and which are arranged in the barrel so as to be rotatable around the optical axis and are in an operative connection with at least one adjusting ring arranged on the outer side of the barrel and can be rotated with the adjusting ring.

3. The microscope objective according to claim 2, wherein the driver rings which are in an operative connection with the adjusting ring are fixedly connected to one another and are rotatable jointly by the adjusting ring around the optical axis.

4. The microscope objective according to claim 2, wherein the driver rings associated with the adjusting ring have threads of identical or different pitch.

5. The microscope objective according to claim 2, wherein spring elements are arranged between the driver rings and the associated threaded rings to eliminate play or lost motion in the thread.

6. The microscope objective according to claim 5, wherein the spring elements are pressure springs.

7. The microscope objective according to claim 2, wherein the bolts engage without play in a bore hole which is formed by at least one springing web and which is open toward the edge of the respective associated threaded ring.

8. The microscope objective according to claim 7, wherein the diameter of the bore hole is less than or equal to the diameter of the part of the respective bolt engaging in the bore hole.

9. The microscope objective according to claim 7, wherein a flexible intermediate member is provided between the bolt and the associated bore hole of the respective threaded ring.

10. The microscope objective according to claim 1, wherein a plurality of adjusting rings are provided, each of which is in an operative connection with at least one driver ring.

11. The microscope objective according to claim 1, wherein a securing element serving to protect a sample is connected to a front correction mount and is movable axially together with the correction mount.

12. The microscope objective according to claim 1, wherein an axially directed pin is provided at an end face situated in the interior of the adjusting ring, wherein an opening which extends over a circumferential area and whose boundary surfaces form stops for the pin is provided in an end face of the barrel situated farther in the interior of the objective, and wherein the adjusting ring has a mark and the barrel has a scale with adjustment marks along at least some of its circumference.

13. The microscope objective according to claim 12, wherein the positions of the axially directed pin and the positions of the stops are oriented toward the mark on the adjusting ring.

* * * * *